(12) United States Patent
Puppi et al.

(10) Patent No.: US 11,981,164 B2
(45) Date of Patent: *May 14, 2024

(54) TYRE COMPRISING A MONITORING DEVICE

(71) Applicant: Pirelli Tyre S.p.A., Milan (IT)

(72) Inventors: Cristiano Puppi, Milan (IT); Ivan Gildo Boscaino, Milan (IT); Andrea Natta, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 543 days.

This patent is subject to a terminal disclaimer.

(21) Appl. No.: 17/261,438

(22) PCT Filed: Jul. 25, 2019

(86) PCT No.: PCT/IT2019/050174
§ 371 (c)(1),
(2) Date: Jan. 19, 2021

(87) PCT Pub. No.: WO2020/026282
PCT Pub. Date: Feb. 6, 2020

(65) Prior Publication Data
US 2021/0309057 A1    Oct. 7, 2021

(30) Foreign Application Priority Data

Aug. 2, 2018 (IT) .......................... 102018000007769
Dec. 4, 2018 (IT) .......................... 102018000010794
Dec. 4, 2018 (IT) .......................... 102018000010795

(51) Int. Cl.
B60C 23/04        (2006.01)
(52) U.S. Cl.
CPC ........ B60C 23/041 (2013.01); B60C 23/0493 (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 4,862,486 A    8/1989    Wing et al.
5,749,984 A    5/1998    Frey et al.
(Continued)

FOREIGN PATENT DOCUMENTS

CN    1714005 A    12/2005
CN    1845831 A    10/2006
(Continued)

OTHER PUBLICATIONS

Notification of the First Office Action issued by the China National Intellectual Property Administration dated Sep. 2, 2022, in corresponding Application No. CN 201980051418.6 (7 pages).
(Continued)

*Primary Examiner* — Andre J Allen
(74) *Attorney, Agent, or Firm* — Finnegan, Henderson, Farabow, Garrett & Dunner, L.L.P.

(57) ABSTRACT

The present disclosure is directed to a tyre comprising a monitoring device fixed on the inner surface at a crown portion of the tyre, wherein the monitoring device comprises an electronic unit and an electric power supplier electrically connected to the electronic unit, the electronic unit comprising a sensor for detecting at least one of temperature, pressure, acceleration, deformation, a processing unit; a transceiver, wherein the monitoring device comprises a flexible support in a single body, the electronic unit being fixed on said the flexible support, wherein the electric power supplier comprises a plurality of electric energy accumulators electrically connected to the electronic unit for supply- (Continued)

ing the electronic unit, and wherein each accumulator is fixed onto the flexible support.

24 Claims, 8 Drawing Sheets

(58) Field of Classification Search
CPC . B60C 23/0433; B60C 23/0493; B60C 19/00; B60C 23/04; B60C 23/041; B60C 23/20; B60C 23/0411; B60C 23/0462; B60C 23/0444; B60C 23/0479; B60C 23/064; B60C 11/24; B60C 23/0488; B60C 23/007; B60C 23/062; B60C 11/246; B60C 23/0401; B60C 23/0413; B60C 23/06; B60C 23/043; B60C 23/0452; B60C 23/0467; B60C 23/0498; B60C 23/02; B60C 99/006; B60C 23/0428; B60C 23/0442; B60C 2019/004; B60C 23/009; B60C 23/0425; B60C 11/243; B60C 23/00354; B60C 23/004; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/0454; B60C 23/00; B60C 23/044; B60C 23/0455; B60C 23/008; B60C 23/0483; B60C 23/0461; B60C 23/0489; B60C 23/0474; B60C 23/0415; B60C 23/0491; B60C 29/064; B60C 25/002; B60C 23/00363; B60C 23/0481; B60C 23/0459; B60C 23/0471; B60C 11/0318; B60C 2200/02; B60C 23/002; B60C 23/0476; B60C 2019/005; B60C 23/042; B60C 23/0477; B60C 23/0405; B60C 23/0422; B60C 23/0423; B60C 23/0466; B60C 13/001; B60C 29/06; B60C 23/0437; B60C 23/0447; B60C 25/132; B60C 23/0427; B60C 23/0449; B60C 25/00; B60C 9/18; B60C 23/0484; B60C 23/0486; B60C 23/065; B60C 13/00; B60C 19/003; B60C 23/00336; B60C 23/08; B60C 17/00; B60C 2019/006; B60C 23/001; B60C 23/00345; B60C 25/142; B60C 17/02; B60C 23/0445; B60C 29/00; B60C 5/004; B60C 11/0083; B60C 25/145; B60C 9/02; B60C 11/0332; B60C 23/0457; B60C 25/18; B60C 99/00; B60C 11/13; B60C 23/0418; B60C 23/0469; B60C 23/12; B60C 29/066; B60C 23/0432; B60C 23/068; B60C 25/005; B60C 25/138; B60C 11/03; B60C 23/005; B60C 25/007; B60C 3/00; B60C 5/14; B60C 11/11; B60C 17/04; B60C 17/06; B60C 23/0435; B60C 23/063; B60C 23/10; B60C 25/0554; B60C 25/14; B60C 29/062; B60C 99/003; B60C 11/032; B60C 11/12; B60C 13/003; B60C 15/06; B60C 19/001; B60C 23/126; B60C 23/127; B60C 23/16; B60C 29/005; B60C 29/068; B60C 3/04; B60C 9/20; B60C 11/01; B60C 11/0302; B60C 13/02; B60C 25/056; B60C 29/04; B60C 5/142; B60C 11/0304; B60C 11/0306; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 1/0016; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/04; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 23/085; B60C 25/0548; B60C 25/185; B60C 7/105; B60C 7/107; B60C 7/12; B60C 9/22
USPC .................................................. 73/146–146.8
See application file for complete search history.

(56) References Cited

U.S. PATENT DOCUMENTS

| | | |
|---|---|---|
| 5,960,844 A | 10/1999 | Hamaya |
| 5,977,870 A | 11/1999 | Rensel et al. |
| 9,796,219 B2 | 10/2017 | Chong et al. |
| 2004/0060629 A1 | 4/2004 | Willard, Jr. et al. |
| 2005/0076982 A1 | 4/2005 | Metcalf et al. |
| 2005/0110277 A1 | 5/2005 | Adamson et al. |
| 2006/0164250 A1 | 7/2006 | Kawai |
| 2007/0013503 A1 | 1/2007 | Chien et al. |
| 2007/0227644 A1 | 10/2007 | Fagot-Revurat et al. |
| 2008/0122707 A1 | 5/2008 | Fagot-Revurat |
| 2008/0303634 A1 | 12/2008 | Toyofuku et al. |
| 2009/0115591 A1 | 5/2009 | Mancosu et al. |
| 2009/0134710 A1 | 5/2009 | Tyndall et al. |
| 2009/0183562 A1 | 7/2009 | Brusarosco et al. |
| 2009/0188310 A1 | 7/2009 | Mancosu et al. |
| 2009/0218459 A1 | 9/2009 | Durif et al. |
| 2010/0007477 A1 | 1/2010 | Wilson et al. |
| 2010/0032066 A1 | 2/2010 | Nakao et al. |
| 2010/0097662 A1 | 10/2010 | DeGraff et al. |
| 2010/0271191 A1 | 10/2010 | de Graff et al. |
| 2011/0001618 A1* | 1/2011 | Yabushita ............. B60C 23/041 429/162 |
| 2011/0023592 A1* | 2/2011 | Hortig .................. B60C 23/0411 73/146.5 |
| 2011/0315292 A1 | 12/2011 | Gougnaud |
| 2014/0118134 A1 | 5/2014 | Won |
| 2014/0352420 A1 | 12/2014 | Brusarosco et al. |
| 2015/0097662 A1 | 4/2015 | Yu et al. |
| 2015/0273956 A1 | 10/2015 | Biegner et al. |
| 2016/0317068 A1 | 11/2016 | Pepin et al. |
| 2017/0001483 A1 | 1/2017 | Sabatini et al. |
| 2017/0040911 A1* | 2/2017 | Tatarchuk .......... H02K 11/0094 |
| 2017/0250633 A1 | 8/2017 | Moiraghi et al. |
| 2018/0257442 A1* | 9/2018 | Elian .................... B60C 23/0493 |

(56) References Cited

U.S. PATENT DOCUMENTS

| | | | | |
|---|---|---|---|---|
| 2020/0182660 A1* | 6/2020 | Kabany | ............... | B60C 23/0493 |
| 2021/0178836 A1* | 6/2021 | Spencer | ............. | H01L 23/5387 |
| 2023/0001753 A1* | 1/2023 | Natta | ................. | B60C 23/0493 |

FOREIGN PATENT DOCUMENTS

| | | |
|---|---|---|
| CN | 1953881 A | 4/2007 |
| CN | 1982098 A | 6/2007 |
| CN | 101068691 A | 11/2007 |
| CN | 101193764 A | 6/2008 |
| CN | 101460320 A | 6/2009 |
| CN | 101553373 A | 10/2009 |
| CN | 101691103 A | 4/2010 |
| CN | 102271932 A | 12/2011 |
| CN | 203254901 U | 10/2013 |
| CN | 104024005 A | 9/2014 |
| CN | 105043428 A | 11/2015 |
| CN | 106163835 A | 11/2016 |
| CN | 107533982 U | 1/2018 |
| DE | 195 32 914 A1 | 3/1997 |
| DE | 102005016354 A1 | 10/2006 |
| DE | 102005051136 A1 | 5/2007 |
| DE | 102007014097 A1 | 9/2008 |
| DE | 10 2012 007 071 A1 | 10/2013 |
| FR | 2894519 A1 | 6/2007 |
| JP | 2006-64565 A | 3/2006 |
| JP | 2012-108152 A | 6/2012 |
| RU | 2659120 C1 | 6/2018 |
| WO | WO 2004/110794 A1 | 12/2004 |
| WO | WO 2005/113262 A1 | 12/2005 |
| WO | WO 2007/048621 A1 | 5/2007 |
| WO | WO 2007/121768 A1 | 11/2007 |
| WO | WO 2011/051800 A1 | 5/2011 |
| WO | WO 2013/098711 A1 | 7/2013 |
| WO | WO 2013/098712 A1 | 7/2013 |
| WO | WO 2016/042580 A1 | 3/2016 |
| WO | WO 2018/065846 A1 | 4/2018 |

OTHER PUBLICATIONS

Notice of Allowance issued by the China National Intellectual Property Administration dated Jul. 14, 2022, in corresponding Application No. CN 201980051424.1 (6 pages).

Notification of Second Office Action issued by the China National Intellectual Property Administration dated Aug. 3, 2022, in corresponding Application No. CN 201980051436.4 (8 pages).

International Search Report form the European Patent Office in corresponding International Application No. PCT/IT2019/050174 dated Jan. 7, 2020.

Written Opinion of the International Searching Authority from the European Patent Office in corresponding International Application No. PCT/IT2019/050174 dated Jan. 7, 2020.

Decision to Grant dated Oct. 26, 2021, from Russian Federal Service for Intellectual Property, in counterpart Russian Application No. 2021103559.

European Office Action issued by the European Patent Office on Dec. 22, 2023, in corresponding Application No. EP 19 755 975.0 (5 pages).

* cited by examiner

TYRE COMPRISING A MONITORING DEVICE

This application is a national stage entry application under 35 U.S.C. § 371 based on International Application No. PCT/IT2019/050174, filed Jul. 25, 2019, and claims priority to Italian Patent Application No. 102018000007769, filed Aug. 2, 2018, Italian Patent Application No. 102018000010794, filed Dec. 4, 2018, and Italian Patent Application No. 102018000010795, filed Dec. 4, 2018; the contents of each application is incorporated herein by reference.

TECHNICAL FIELD OF THE INVENTION

The present invention relates to a tyre comprising a monitoring device, for example suitable for monitoring at least one physical quantity among temperature, pressure, deformation, acceleration.

STATE OF THE ART

Typically a tyre has a substantially toroidal structure around an axis of rotation of the same during operation, and it has an equatorial plane orthogonal to the axis of rotation, said equatorial plane being typically a plane of (substantial) geometric symmetry (e.g. ignoring any minor asymmetries, such as the tread design and/or the writing on the sides and/or structure or profile asymmetries).

With "inner cavity" it is meant the space delimited by the inner surface of tyre and by the surface of the rim facing towards the inner surface of the tyre, when mounted.

With "crown portion" it is meant the portion of tyre placed between the two sides of the tyre, i.e. at the position of the tread band.

The terms "radial" and "axial" are used with reference respectively to a substantially perpendicular direction and to substantially parallel direction to the rotation axis of the tyre.

The term "tangential" is used with reference to a direction generally faced according to the rolling direction of the tyre, substantially perpendicular to both the radial direction and the axial direction.

With "footprint" it is meant the portion of outer surface of the tread band which, during the rolling of the tyre mounted and subjected to a load (for example due to effect of the mounting under a vehicle), at each instant is in contact with the rolling surface. The footprint typically has a substantially null curvature (or substantially infinite curvature radius), or in each case it substantially assumes the conformation of the rolling surface.

There have been proposed tyres for vehicles comprising monitoring devices of one or more physical quantities arranged in the inner cavity of the tyre, for example as described in US 2014/0118134 A1; U.S. Pat. Nos. 4,862,486; 5,749,984; 5,960,844; 5,977,870; US 2008/0303634 A1; US 2009/0134710 A1; US 2010/0007477 A1, DE102012007071 A1, WO2007/121768 A1, WO2007/048621 A1, WO2013/098711 A1, WO2013/098712 A1, WO2018/065846 A1, US 2007/0013503 A1, US 2010/0097662 A1.

SUMMARY OF THE INVENTION

In the context of tyres comprising monitoring devices arranged in the inner cavity of the tyre, the Applicant has made the following considerations.

It is preferable to detect the desired physical quantity, in particular the temperature, the deformation or the acceleration, directly onto the, or near to the, inner surface of the tyre at its crown portion. For example, it is preferable to acquire the temperature near to the inner surface of the crown portion, since in this way it is substantially acquired the actual temperature of the tyre material in the area in which the greatest stresses develop, which tend to heat the tyre during the rolling. On the contrary, the temperature for example near to the rim or the temperature of the fluid present in the inner cavity can be very different from the temperature of the inner surface of the crown portion. Moreover, when the temperature is obtained, for example near to the rim or the inflation valve, the data measured is influenced by the temperature of the environment outside the wheel due to the heat conduction and/or the presence of external heat sources such as air flows from the radiators or the brake discs.

In the case of the acceleration or of the deformation, it is preferable a direct measurement of at least one of the radial, tangential and axial components of the acceleration or of the deformation undergone by an arbitrary point located onto the inner surface of the crown portion which is subjected to stress and deformation due to the cycle of entry and exit from the footprint, or more generally from the interaction between the tyre and the rolling surface. In this way it is possible to obtain from the detected acceleration or deformation signal information on the status and/or instantaneous behaviour of the tyre during use (e.g. size of the footprint, wear, hydroplaning, slippage, etc.). Therefore it is desirable to apply the acceleration and/or deformation sensor, or the sensors, to a point close to where the greatest stresses are generated, i.e. near to the contact between the tyre and the rolling surface, as typically a point on the inner surface of the crown portion for example placed in correspondence with the central rib arranged in the axially central area of the tread, or in any case in a point on the inner surface of the crown portion corresponding to the most stressed area (both mechanically and thermally) of the tread during the tyre rolling.

For the realization of the monitoring device a PCB ('Printed Circuit Board') technology is typically used, based on a rigid support, on which the circuit tracks (electrically conductive metal tracks) are printed and the electronic components are fixed through the respective electrical connections (e.g. "pin") by welding and, possibly, adhesives. In this way the electrical and mechanical connections between the various electrical and electronic components and the rigid support are realized. Typically, the rigid support (PCB) comprises one or more layers of a base material, such as glass fibre, impregnated with a resin (e.g. epoxy).

However, the use of this technology involves a non negligible weight of the rigid support itself, as well as a concentration of the mass of the support and of the components welded on it at a point located on the tyre.

Furthermore, for the operation of the monitoring device it is usual to provide an electric energy accumulator/generator. For example, typically a battery (e.g. coin cell) comprising a metal capsule is used. This electric energy accumulator/generator typically has a significant weight. For example, a non-rechargeable coin cell battery of the CR2032 type, with an electric charge of about 200-250 mAh, can have a mass of about 3 g.

The prevalent tendency is to make the overall monitoring device as compact as possible. For example, a used solution envisages to superimpose on each other, appropriately connected, an accumulator and the PCB with all the electronic components fixed on it, and to encapsulate the whole with an encapsulating material (e.g. polymeric resin), possibly inside a rigid containment body. Furthermore, a housing can be provided (for example made of elastomeric material) to couple the device to the surface of the tyre by means of an attachment patch and/or one or more adhesives. The set of these structures (containment body, encapsulant, housing, adhesive/s) entails a further increase in weight, for a total overall weight of the entire monitoring device which can reach 8-15 g, almost all located in a small area, equal to the plan area of the container (for example, inscribed in a circle with diameter of 18-30 mm).

The Applicant, in conducting tests at very high tyre rotation speeds (corresponding to extreme linear speeds of a corresponding vehicle, for example over 300 km/h) with a monitoring device thus formed and fixed on the inner surface of the crown portion of the tyre in the axially central area, has verified that the location of the aforesaid overall mass, and in particular that of the accumulator, generates very intense stresses (in particular radial and tangential stresses).

In fact, in the areas of entry and exit from the footprint, due to the corresponding deformation undergone by the tyre, the radial acceleration is greater than in the areas outside the footprint. From experimental surveys, carried out by the Applicant at different speeds, the maximum acceleration at the entrance and exit of the footprint is about 1.5 times the radial acceleration outside the footprint. Moreover, in the footprint area, while the radial acceleration nullifies, a tangential acceleration appears which follows, along the footprint, a pattern similar to a sinusoid, whose amplitude has been experimentally determined by the Applicant to be equal to about the half of the radial acceleration at the footprint entry/exit.

According to the Applicant, the acceleration with its rapid and intense variation on high-frequency cycles generates significant cyclic stresses, in radial direction (such as a 'hammering') and in tangential direction (shear), caused by the device on the tyre structures and/or vice-versa. At the aforementioned extreme speeds, these stresses have as direct consequence a significant and localized overheating of the monitoring device and/or of the tyre at the point of application of the monitoring device. Said overheating can significantly distort the reading of the correct operating temperature of the tyre by the monitoring device. Furthermore, said overheating and said mechanical stress and/or the combination of the two effects can lead to a damaging of the monitoring device (or its components, for example of the accumulator), relatively to its structural and/or functional integrity, and/or to its coupling with the inner surface of the tyre (for example decomposition and/or detachment of the adhesive for applying the device to the inner surface). In more serious cases, said overheating and said mechanical stress and/or the combination of the two effects can lead to the loss of structural integrity of the crown portion of the tyre, even up to the formation of holes (so-called "blisters") at the tread band, caused by the localized decomposition of the tyre compound subsequently removed due to the rotational movement of the latter and/or to the delamination of the tread.

The Applicant has further realized that, when a non-rechargeable energy accumulator such as the aforementioned coin cell batteries is used, it is desirable for this accumulator to contain a sufficient amount of available energy for a period of several years, compatible with the whole life of the tyre.

The Applicant has found that the use of an accumulator with this amount of energy leads to an increase in the relative mass, with a consequent increase in the stresses above described and an exacerbation of the aforementioned problems caused by these stresses.

The Applicant has therefore faced the problem of making a monitoring device of at least one physical quantity (for example temperature, and/or pressure and/or acceleration and/or deformation) to be directly applied near to the inner surface of the crown portion of a tyre, being able to avoid or to limit the localized overheating and the consequent risk of detecting an incorrect temperature value and/or of loss of structural or functional integrity of the tyre and/or of the monitoring device, even at very high rotation speeds of the tyre, and also in presence of a significant accumulation of electric power, compatible with the average life of a tyre.

According to the Applicant the aforesaid problem is solved with a monitoring device in which the electronic unit and the electric power supplier are fixed onto a flexible support, wherein the electric power supplier comprises a plurality of electric energy accumulators separately fixed onto the flexible support.

According to an aspect the invention relates to a tyre comprising a monitoring device. The monitoring device is fixed on an inner surface of said tyre at a crown portion of said tyre.

The monitoring device comprises an electronic unit and an electric power supplier electrically connected to said electronic unit.

The electronic unit comprises: at least one sensor for detecting at least one of the following physical quantities: temperature, pressure, acceleration, deformation; a processing unit; a transceiver.

The monitoring device further comprises a flexible support in a single body (for example a film made of thermoplastic material). The electronic unit is fixed on said flexible support.

Preferably said electric power supplier comprises a plurality of electric energy accumulators, each accumulator being electrically connected to said electronic unit and suitable for supplying said electronic unit. Each of said accumulators is fixed onto said flexible support.

With 'electric power supplier' it is meant a component structured to supply electric power to the electronic unit, which can consist in the above said plurality of accumulators, wherein the power to be supplied is pre-accumulated (e.g. battery or capacitor), or it can contain a generator and/or receiver in situ of electric power suitable for re-charging the accumulators and, preferably, for directly supplying the electronic unit (for example a power recovery device or 'energy scavenging or harvesting' device, or an electromagnetic induction charger).

The presence of a plurality of electric energy accumulators distinct from each other and separately fixed onto the flexible support causes the accumulators to be distributed onto the inner surface. In other words, the accumulators are not—not even partially—radially superimposed to each other. Moreover, they are also not radially superimposed to the electronic unit—not even partially—given that the electronic unit is fixed onto the flexible support. According to the Applicant, this solution causes the overall mass of the monitoring device to be reduced, due to the elimination of a component of significant mass such as the PCB, as well as of the encapsulating material. Moreover, the distribution of the electronic unit and of the accumulators onto the flexible support allows to avoid the addition of further material (for example encapsulating material) in the monitoring device, with a significant reduction of both the mass and the overall thermal inertia of the device itself, with advantages in the reliability, correctness and promptness of the detection of the physical quantities (in particular of the temperature), as well as in a lower attenuation of the radiofrequency signals transmitted and/or received by the monitoring device. Moreover, the subdivision of the overall mass of the power supplier into several parts (the accumulators), each part having a non-negligible mass with respect to the overall mass of the device, allows to reduce the mass which insists, with the consequent aforesaid hammering phenomenon and of shear stress, on a respective single localized crown portion of the tyre: this entails a reduction of the consequent overheating of the crown portion and/or of the adhesive used to fix the monitoring device on the inner surface of the tyre and/or of the monitoring device itself. This, together with the fact that the electronic unit and each accumulator are at separate crown portions, allows a more correct detection of the value of the operating temperature of the tyre. All this in addition to the possibility of making available a high overall capacity for storing electric power in the monitoring device, given by the sum of the individual capacities of each accumulator, all to the benefit of the useful life of the monitoring device itself.

The flexible support, unlike a rigid support such as a PCB, also allows to the monitoring device to adapt to the deformation of the crown portion during rolling, in particular at the footprint. Moreover, it allows to distribute the stresses on a wider surface.

The present invention can have one or more of the following preferred features.

Preferably each of said accumulators is an electric battery (for example a coin cell battery), more preferably non re-chargeable.

Preferably each of said accumulators has circular plan.

Preferably each of said accumulators comprises a rigid housing, for example made of metal.

Preferably each of said accumulators has a charge capacity greater than or equal to 30 mAh, more preferably greater than or equal to 80 mAh, even more preferably greater than or equal to 100 mAh.

Typically, each of said accumulators has a weight greater than or equal to about 0.5 g, more preferably greater than or equal to about 1 g. Preferably each of said accumulators has a weight lower than or equal to about 4 g. For uses on tyre suitable for heavy loads (such as tyre for SUV, CUV, truck, bus, etc.) batteries of greater weight can be used, till about 7-8 g.

Preferably each of said accumulators is inscribed in a circle having diameter lower than or equal to 30 mm, more preferably lower than or equal to 25 mm, and/or circumscribed to a circle having diameter greater than or equal to 15 mm, more preferably greater than or equal to 17 mm.

These types of accumulators are able to supply sufficient energy for the operation of the device even over periods compatible with the average life of a tyre (depending on its different uses), and/or even in the presence of complex device functionalities, such as detection of different parameters such as acceleration, length and/or shape of the footprint, vertical load acting on the tyre, etc.

Preferably each of said accumulators is structured to resist to temperatures greater than or equal to 100° C., more preferably greater than or equal to 110° C. In this way the accumulators resist to the overheating temperatures of the tyres.

Typically, the monitoring device comprises an electric connection circuit for connecting each accumulator to said electronic unit, wherein preferably said electric connection circuit comprises at least two separate electric paths (one for the connection to the positive pole and one for the connection to the negative pole of the accumulators).

Preferably said accumulators are electrically connected to said electronic unit in parallel. In this way the capacity of the accumulators is added, thus being able to obtain a significant duration of the monitoring device and/or an increase of the detection functionality.

Preferably the electric connection circuit is fixed onto said flexible support, more preferably printed onto said flexible support with a conductive ink, even more preferably printed with serigraphic, lithographic, by ink jet, etc. technology. In one embodiment the electric connection circuit comprises copper conductive tracks, preferably obtained by chemical etching of a thin layer (e.g. few microns or few tens of microns) of copper. These technologies are particularly suitable for flexible substrates and are capable of creating conductive tracks resistant to flexion. Preferably a distance between each pair of accumulators is greater than or equal to 40 mm, more preferably greater than or equal to 50 mm. With 'distance' it is meant the length of the shortest line on the inner surface of the tyre (in the undeformed state) joining the edges of the two considered accumulators (e.g. the edges of a housing of an accumulator). The Applicant has observed that in this case the temperature distributions (determined by the heating phenomenon due to the cyclical stresses of entry/exit from the footprint and the phenomenon of the propagation of the produced heat) individually associated with each accumulator are spatially substantially decoupled from each other, so that a localized heat build-up is avoided. In other words, the accumulators are sufficiently far apart from each other to prevent that the local heating of the individual accumulators adds up in a point, with the further advantages described above.

Preferably said distance between each pair of accumulators (14) is lower than or equal to 250 mm, more preferably lower than or equal to 200 mm, even more preferably lower than or equal to 150 mm. In this way the length of the electric connection circuit and/or the extension of the overall device is limited, and the consequent complications in terms of fabrication, coupling (bonding) with the tyre, structural resistance of the tracks, etc are reduced.

Preferably the equatorial plane of the tyre crosses said monitoring device, more preferably it crosses said electronic unit, for example at said sensor. In this way the device (preferably the sensor) is applied in a portion of the tyre subjected to the greatest stresses and—therefore—of greater interest in the case of signal measurements (e.g. accelerometers) from which information on the status and/or on the instantaneous behaviour of the tyre during the use is to be detected.

Preferably said at least one sensor is suitable for detecting at least two of the following physical quantities: temperature, pressure, acceleration, deformation, for example temperature and pressure. Even more preferably said at least one sensor is suitable for detecting at least three of, or all four, the above said physical quantities. Preferably said at least one sensor is suitable for detecting at least said acceleration and/or said deformation, more preferably at least a radial component and/or a tangential component of said acceleration and/or of said deformation. In this way the monitoring device provides particularly useful data for obtaining the status and/or the operation of the tyre, and/or the behaviour of the vehicle on which it is mounted. Preferably said flexible support is fixed to the inner surface of said tyre, more preferably by means of a layer of adhesive (e.g. a pressure sensitive adhesive).

Preferably said flexible support is substantially inextensible. In this way the shear stresses are distributed and/or the stresses on the tracks of the connection circuit are limited.

For the purposes of the present description and of the claims which follow, with "flexible support" it is generally meant a support made of a material (including a composite/layers material) which, if used for making a square-shaped slab on the side significantly greater than the circumferential extension of the area of entry or exit from the footprint region of a tyre (for example a 120 mm×120 mm surface plate) and of a thickness equal to the support, allows this plate to conform—to ambient temperature—to a cylindrical surface of radius smaller than the normal curvature radius of a tyre inflated to its nominal pressure (for example a cylindrical surface of radius 200 mm, preferably 100 mm, more preferably 50) without breaking or undergoing a permanent deformation.

For the purposes of the present description and of the claims which follow, with "non extensible support" it is generally meant a support with a thickness from about 10 μm to about 400 μm, preferably from about 50 μm to about 200 μm, made of a material (including a composite/layers material) having traction elastic modulus preferably greater than 0.1 GPa, more preferably greater than 0.5 GPa at 23° C.

Preferably said flexible support (13) is a film of an elastomeric or thermoplastic material selected from the following group: nylon, PET, PEN, polyimide, EPDM, diene polymers and polyurethane resins. Paper substrates, thin sheets in epoxy resin (possibly reinforced, for example with glass fibres) or super-thin and therefore flexible sheets of silicon (or another semiconductor) can also be used. These flexible supports have proved to be suitable for technologies in which the electric connection circuit is printed or deposited onto the support or chemically etched, and the pre-fabricated electronic components are fixed, and electrically connected, to the electric connection circuit by bonding with conductive adhesives (for example adhesives loaded with conductive particles such as silver, copper or carbon particles) and/or by welding, for example with tin or its alloys (for example tin-bismuth).

Preferably one or more of said at least one sensor, said processing unit and said transceiver is a pre-fabricated electronic component. This pre-fabricated electronic component can be (directly) fixed, and electronically connected, to the electric connection circuit, for example by bonding with conductive adhesives and/or welding. In one embodiment one or more of said at least one sensor, said processing unit and said transceiver is directly made in situ onto the flexible support (i.e. it is not pre-fabricated), for example by printing or deposition technologies.

Preferably at least two among said sensor, said processing unit and said transceiver, more preferably all three, are arranged in a single assembly, preferably pre-fabricated (for example by means of a containment body which houses at least partially said at least two among said sensor, said processing unit and said transceiver). In this way the realization of the monitoring device is significantly simplified.

Typically, said electronic unit has an overall weight greater than or equal to about 1 g, and/or lower than or equal to about 8 g, more preferably lower than or equal to about 6 g. With "overall weight" of a given element it is meant its total weight, for example considering all the active and passive components, the possible container, etc. Preferably said plurality of accumulators comprises a first and a second accumulator arranged at opposite sides of said electronic unit. By interposing the electronic unit between the two accumulators, the latter are placed at a greater mutual distance than a placement on the same side of the electronic unit, with the same overall dimensions of the monitoring device. In this way, it is avoided or it is further limited the aforementioned phenomenon of adding of the heating effects of the two individual accumulators, with consequent overheating (in particular at the most stressed areas of the tyre tread, such as for example the central rib).

Preferably said plurality of accumulators comprises two and no more than two accumulators. In this way it is limited the plan encumbrance and the complexity of the monitoring device.

Preferably said monitoring device has a plan with elongated shape along a longitudinal direction of main development, wherein said first and second accumulators are arranged at longitudinally opposite ends of the monitoring device. This shape has proved to be rational and particularly efficient for limiting the overheating and/or for guaranteeing the integrity of the monitoring device. For example, since the accumulators (i.e. the typically heavier parts) are placed in a peripheral or extreme position of the support, the stress (radial and/or tangential stresses) and the relative deformations produced by the accumulators on the flexible support in the area of the circuits and of the electronic unit (located substantially in the central area of the support) are limited, all to the benefit of the device functionality.

In one embodiment (particularly suitable for the tyres for cars), the monitoring device is fixed to the inner surface of the tyre so that a straight line passing through the centres of mass of the accumulators (e.g. a straight line coinciding with the main development longitudinal direction) forms with a direction of intersection of the equatorial plane with the inner surface of the tyre (or an its parallel direction) a right angle or an acute angle greater than or equal to 20°, more preferably greater than or equal to 25°. In this way it is possible for example to place the electronic unit at the tread portion most stressed during the rolling (for example the portion located at the equatorial plane), and the accumulators (which can be damaged when overheated and/or can overheat and damage because of their weight the underlying crown portion of the tyre) in a less stressed point. It is observed that for the purpose of the identification of the straight line passing through the centres of mass of the accumulators, of the direction of intersection of the equatorial plane with the inner surface and of the aforementioned angle it is considered the portion of inner surface of the tyre around the device developed onto a plane.

Preferably said acute angle is lower than or equal to 70°, more preferably lower than or equal to 65°. This positioning of the monitoring device, with elongated shape, neither parallel nor perpendicular to the equatorial plane, but oblique, allows to arrange the masses of the accumulators in such a way that they do not all lie on the same circumferential tread portion (as would instead happen in the case of positioning parallel to the equatorial plane). The Applicant has also verified that this solution allows to reduce or to eliminate the occurrence of rippling, or curling, phenomena of the flexible support that can occur with the device positioned perpendicularly in particular conditions (for example for long devices, at high speeds, for certain choices of the material of the flexible support, for particular tyre structures and/or tread design, etc).

Preferably an aspect ratio between a longitudinal length of the monitoring device and a width along a direction perpendicular to the longitudinal direction is greater than or equal to 2, more preferably greater than or equal to 2.5, even more preferably greater than or equal to 3, and/or lower than or equal to 6, more preferably lower than or equal to 5. These values of the aspect ratio give to the monitoring device a main development length with respect to which the device itself can be fixed to the tyre with an optimal orientation with respect to the stresses, while the dimension perpendicular to it, due to its much smaller length, undergoes a much lower degree of stresses.

In one embodiment said plurality of accumulators comprises at least a third accumulator, more preferably even at least a fourth accumulator (and preferably no more than four accumulators). In this way the capacity (and/or the supplied voltage) of the power supplier is enhanced.

Preferably said accumulators are arranged around said electronic unit, more preferably substantially angularly equidistant from each other, even more preferably along a circle which surrounds said electronic unit, even more preferably centred onto (a geometric centre of) said electronic unit. In this way the distance between the accumulators, for a given plan encumbrance, is maximized.

Preferably said accumulators are arranged at end positions of said flexible support (e.g. close to an edge of said flexible support). As explained above, in this way the stresses and the deformations exerted by the accumulators on the electronic components and on the conductive tracks of the device are reduced.

BRIEF DESCRIPTION OF THE DRAWINGS

The characteristics and advantages of the present invention will be further clarified by the following detailed description of some embodiments, presented by way of non-limiting example of the present invention, with reference to the attached figures, in which.

DETAILED DESCRIPTION OF SOME EMBODIMENTS OF THE INVENTION

Figure 1:
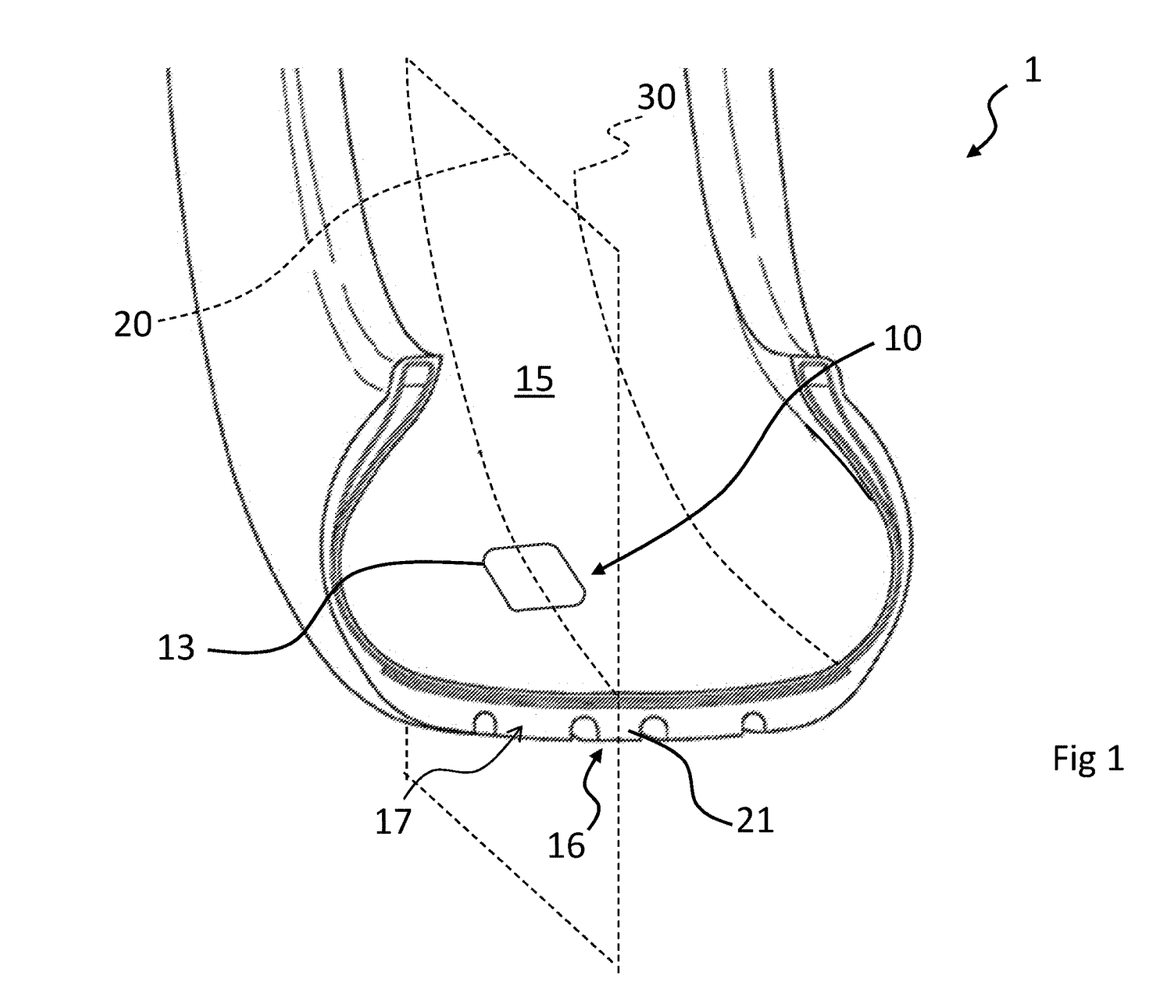
FIG. 1 shows a schematic, perspective and partial view of a section of tyre comprising a monitoring device according to the present invention.

In the figures with reference number 1 it is shown a tyre (in partial perspective section) comprising a monitoring device 10 according to the present invention. In the present description and figures the same reference number is used for the same elements, also in their embodiments.

The monitoring device 10 comprises an electronic unit 11 and an electric power supplier 12 electrically connected to the electronic unit.

The monitoring device 10 further comprises a flexible support 13 in a single body, fixed onto the inner surface 15 of the tyre at a crown portion 16 of the tyre 1 (i.e. the portion of tyre at the tread band 17). The electronic unit and the electric power supplier are fixed onto the flexible support 13, for example by means of conductive adhesive (e.g. Henkel® 3104 WXL) and of structural adhesive (e.g. Henkel® LOC-TITE® 312™).

According to the present invention, the electric power supplier 12 comprises a plurality of distinct electrical energy accumulators 14, each accumulator 14 being electrically connected to the electronic unit for supplying the electronic unit. Each accumulator 14 is directly fixed onto the flexible support 13.

Exemplarily each accumulator 14 is an electric battery, for example a coin cell battery of the type CR2032HR sold by Maxell® (capacity 200 mAh, weight 3 g, diameter and thickness 20×3.2 mm), or BR1632A sold by Panasonic® (capacity 120 mAh, 1.5 g, 6×3.2 mm). The typical voltage is equal to 3V, and the operating temperature range from −40° C. to +125° C. (or possibly in sub-intervals, depending on the type of envisaged use).

Figure 4:
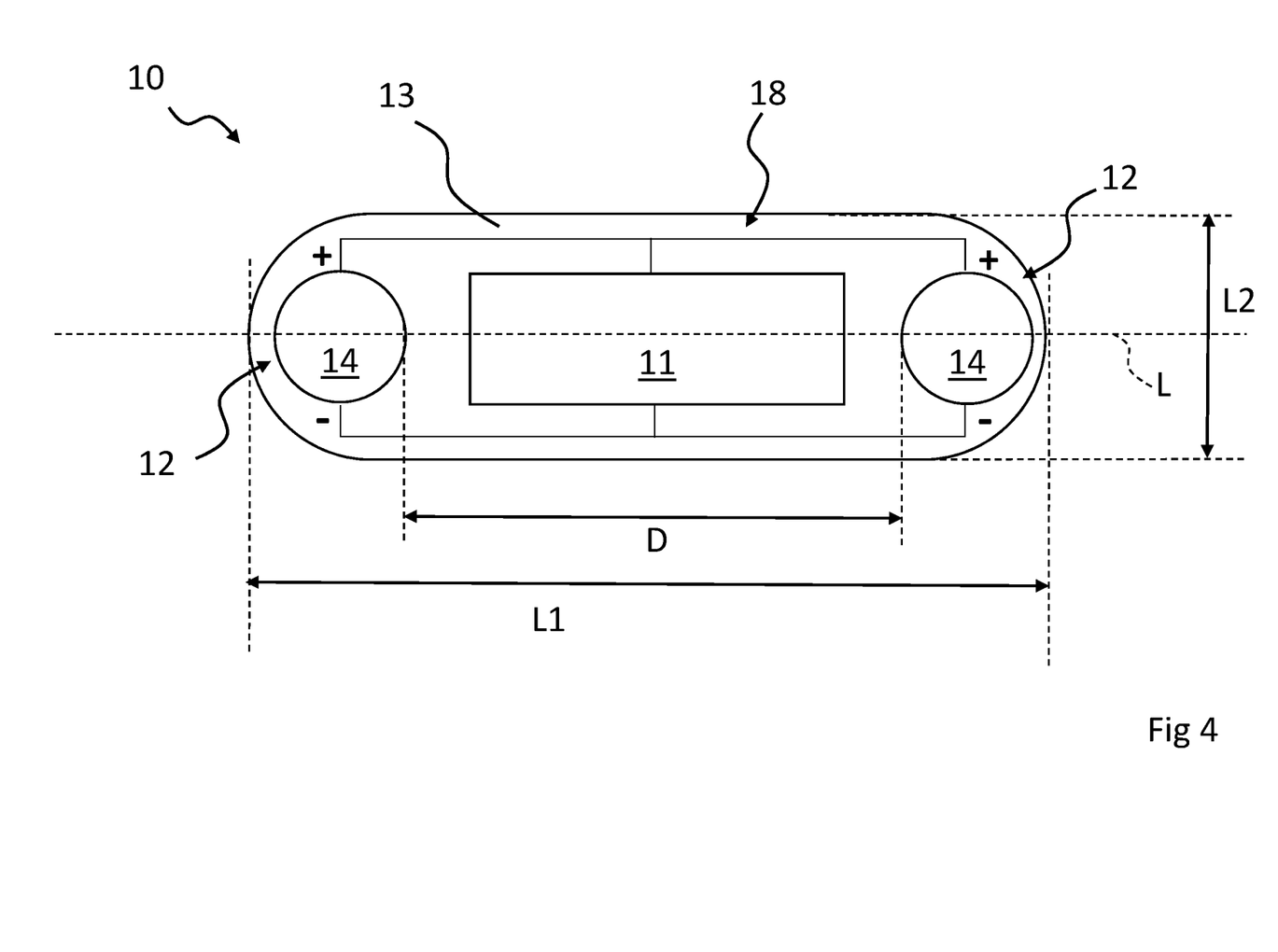

The monitoring device 10 comprises an electric connection circuit 18 (shown only schematically in the figures) for connecting each accumulator 14 to the electronic unit 11, preferably in parallel (as exemplarily shown in a schematic way only in FIG. 4). In one embodiment, the tracks of the electric connection circuit are made with a conductive ink (e.g. silver conductive ink DuPont® 5025) printed with serigraphic technique directly on the flexible substrate.

The electronic unit 11 comprises (not shown) at least one sensor for detecting at least one of the following physical quantities: temperature, pressure, acceleration; a processing unit and a transceiver.

As an example, the electronic unit can include a prefabricated assembly model FXTH870911DT1 sold by NXP Semiconductors®, comprising a processing unit and a plurality of sensors suitable for detecting all the three physical quantities: temperature, pressure and acceleration. This assembly also includes an RF transceiver with a transceiver frequency of 315-434 MHz. In an exemplary embodiment, it can be used a further transceiver fixed to the flexible separately from the aforementioned assembly, usable on a different frequency band (for example with Wifi or Bluetooth® technology).

Exemplarily the flexible support 13 is a film made of polyimide (e.g. Kapton® by DuPont®).

A layer of adhesive (not shown), for example pressure sensitive, may be arranged to bond the lower face of the flexible support to the inner surface of the tyre. In the embodiments shown in the figures, the device 10 is applied to the inner surface of the tyre in such a way that the equatorial plane 20 of the tyre crosses the monitoring device 10, and more specifically it crosses the electronic unit 11 (so that the sensor is located at or near to the central rib 21 of the tread 17).

Figure 2:
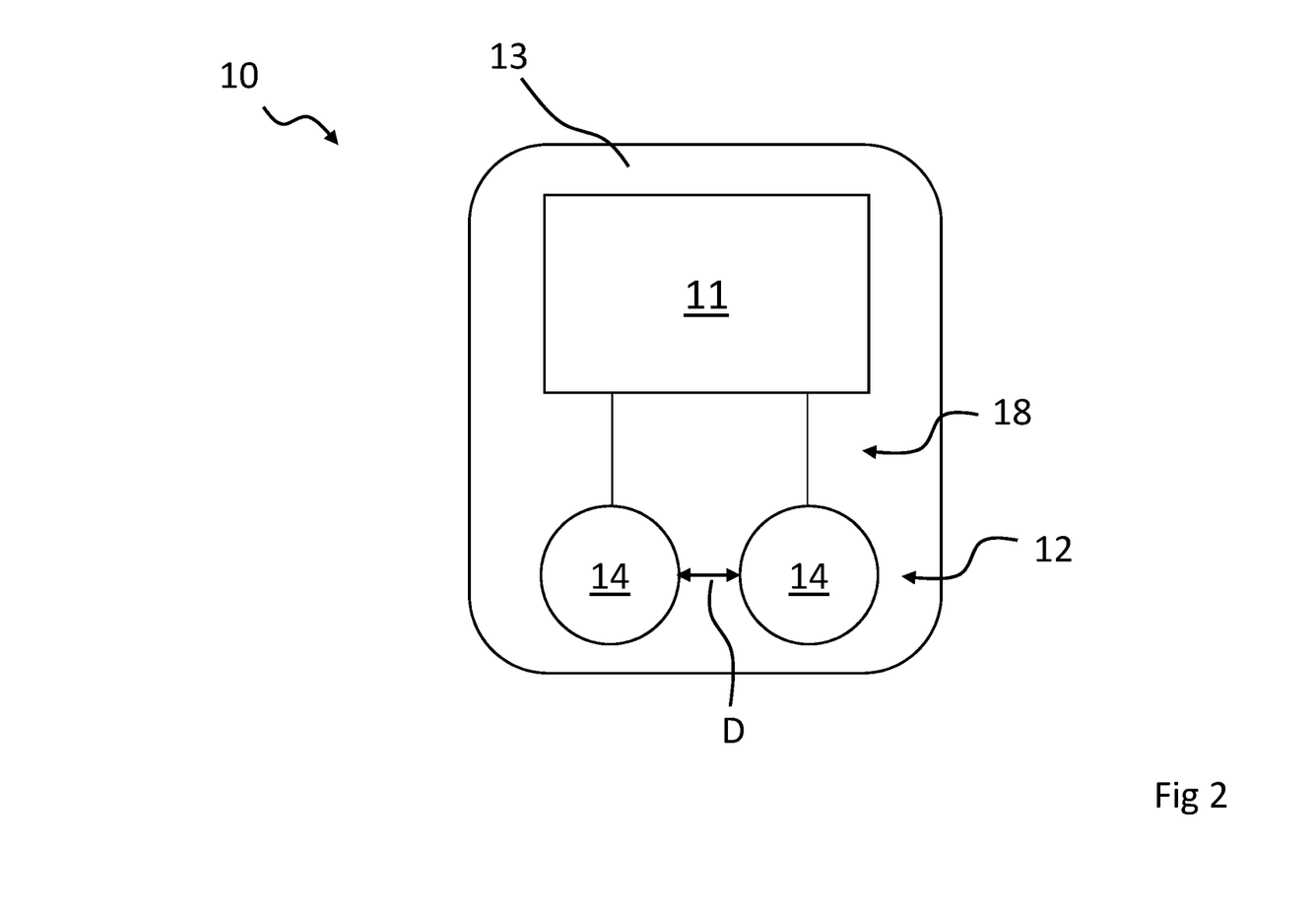
FIGS. 2-6 show a schematic plan view of respective embodiments of the monitoring device according to the present invention.
Figure 3:
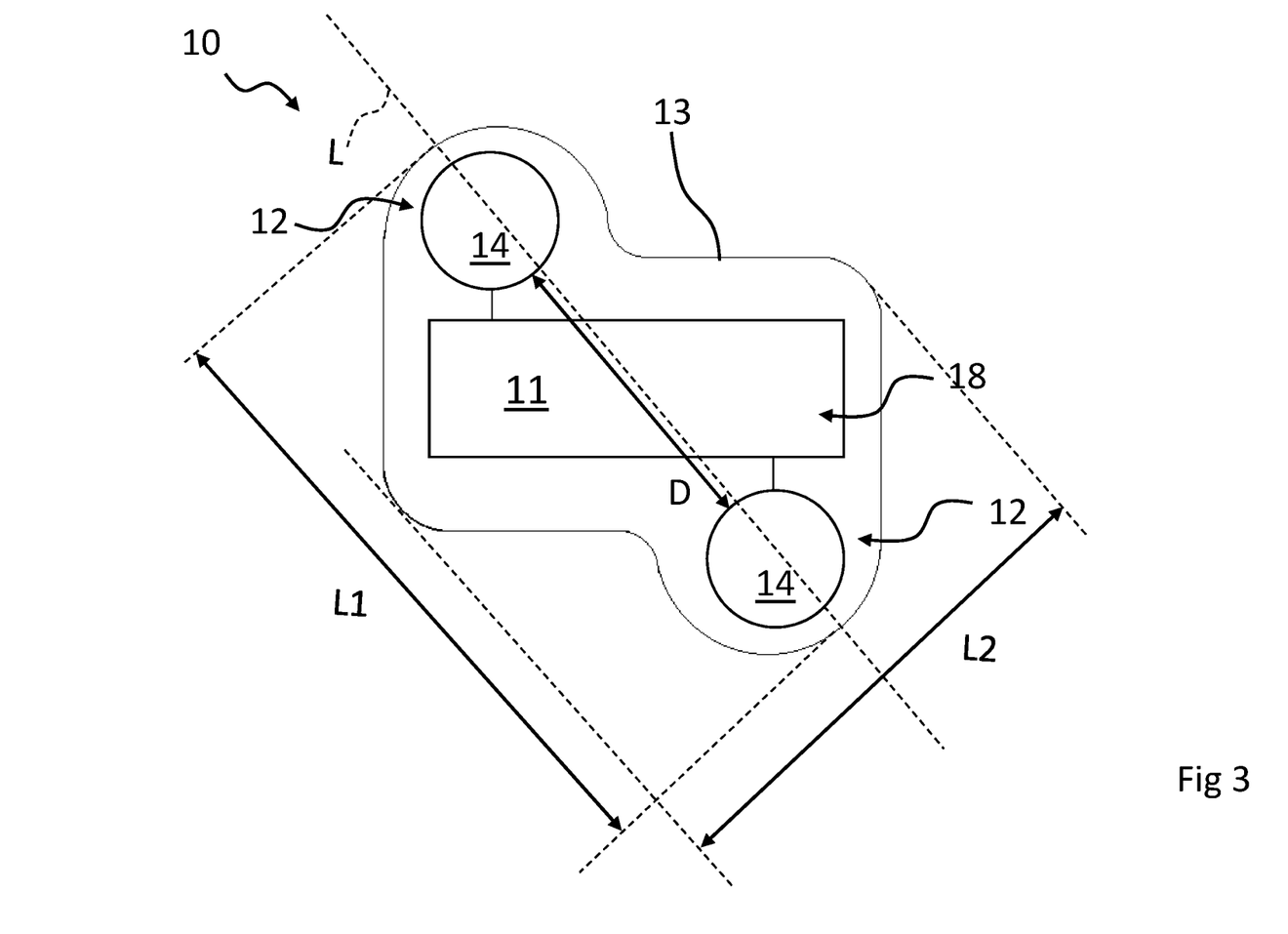

In some embodiments, the plurality of accumulators 14 comprises two and no more than two accumulators, as shown exemplarily in FIGS. 2, 3 and 4.

Preferably the two accumulators are arranged on opposite parts of the electronic unit 11, as exemplarily shown in the FIGS. 3 and 4.

According to an aspect of the invention, and as schematically shown in FIGS. 3 and 4, the monitoring device 10 has a plan (e.g. defined by the plan of the flexible support 13) with an elongated shape along a longitudinal direction L of main development, the two accumulators being arranged at longitudinally opposite ends of the monitoring device.

Exemplarily, in the case of the device of FIG. 3, the dimensions L1×L2 respectively along this longitudinal direction L and along the dimension perpendicular to it (in the plane of FIG. 3) are equal to about 80×55 mm (aspect ratio R equal to about 1.5) and the distance D between the two accumulators is equal to about 45 mm.

Exemplarily, in the case of the device of FIG. 4, the dimensions L1×L2 are equal to about 110×30 mm (aspect ratio R equal to 3.7) or about 80×25 mm (R equal to 3.2).

Exemplary the distance D between the two accumulators is equal to about 69 mm in the case of the dimensions 110×30 mm, while for dimensions equal to 80×25 mm the distance D is equal to about 50 mm.

Figure 7:
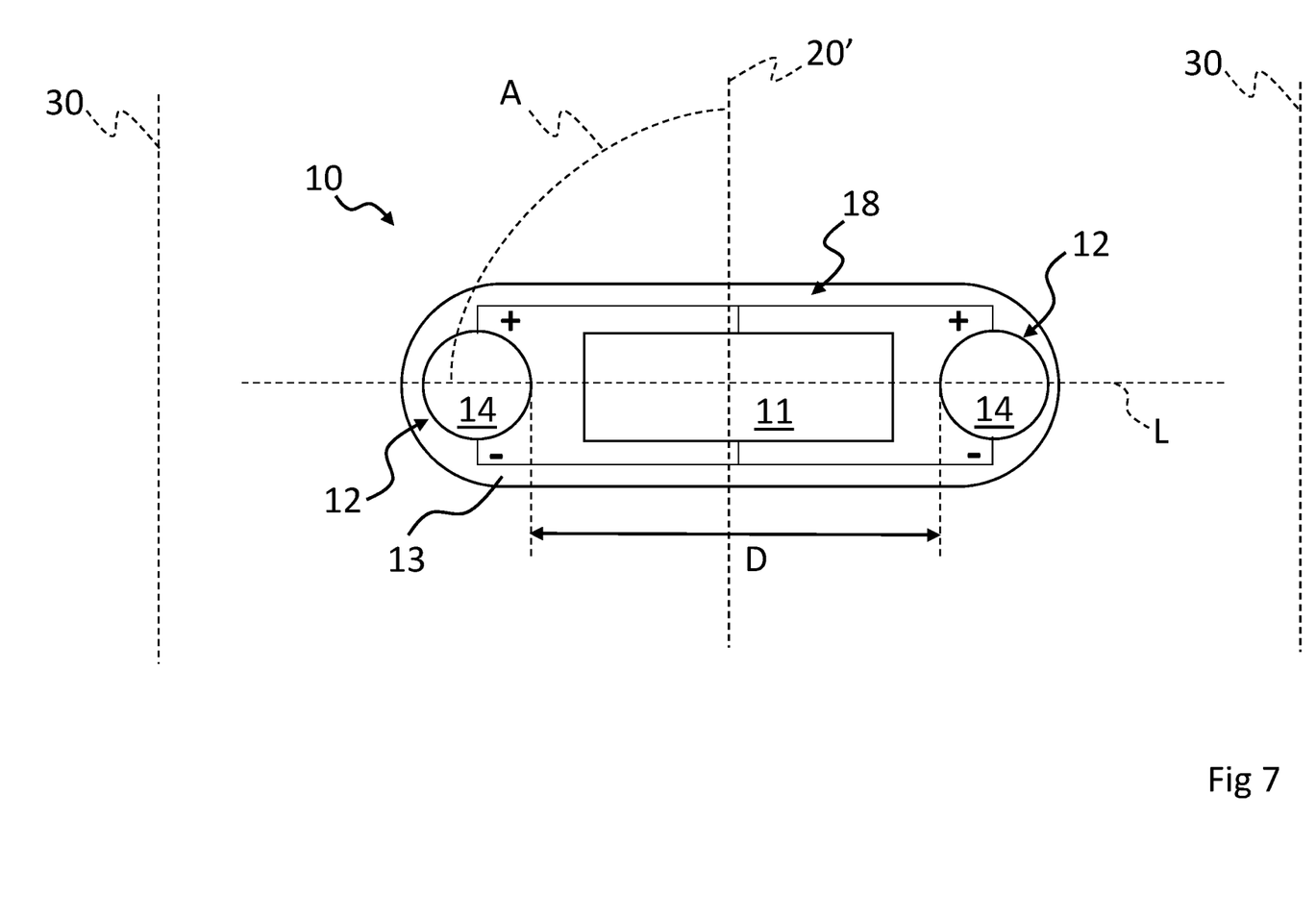
FIGS. 7 and 8 show a schematic and partial view of the inner surface of the tyre developed on the plane of the figure and comprising a monitoring device positioned according to two respective preferred ways.
Figure 8:
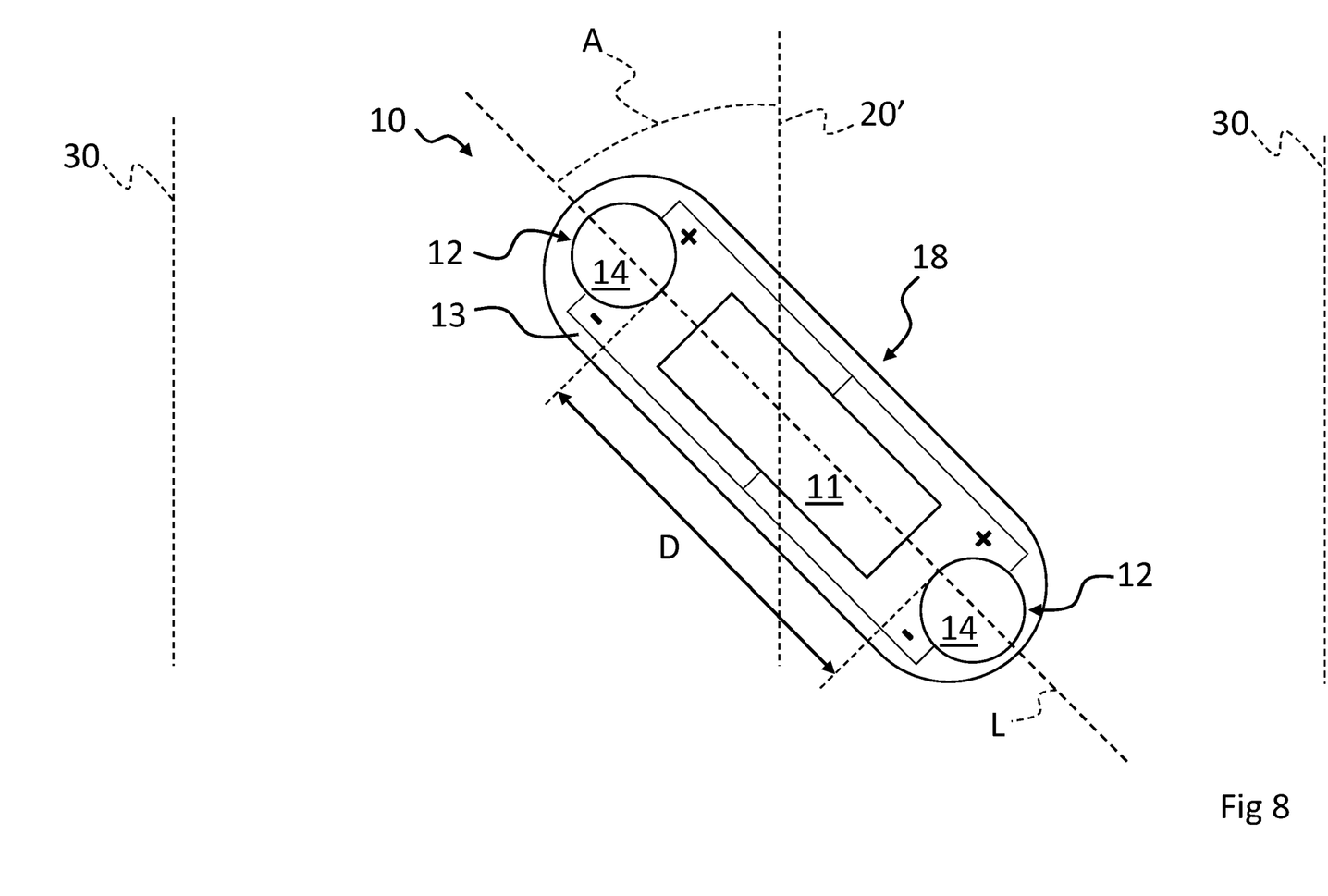

As exemplarily shown in FIG. 7 (wherein the inner surface of the crown portion schematically delimited by the directions 30, as well as the monitoring device, has been developed on the plane of the figure) an angle A formed between a straight line L passing through the centres of mass of the accumulators 14 (in the example coinciding with the direction L of main development) and the direction of intersection 20' between the equatorial plane and the inner surface is exemplarily a right angle. In this way the electronic unit 11 can lie on the equatorial plane, while the accumulators 14 lie completely outside the equatorial plane, and thus far from the central rib. In a preferred alternative form, as exemplarily shown in FIG. 8, the acute angle A formed between the straight-line L and the intersection 20' between the equatorial plane and the inner surface is exemplarily equal to 45°. Even in this case the electronic unit 11 can lie on the equatorial plane, while the accumulators 14 lie far enough from the central rib, and at the same time the effects on the flexible support of possible deformations of the tyre and/or of the flexible support along the axial direction are reduced.

Figure 5:
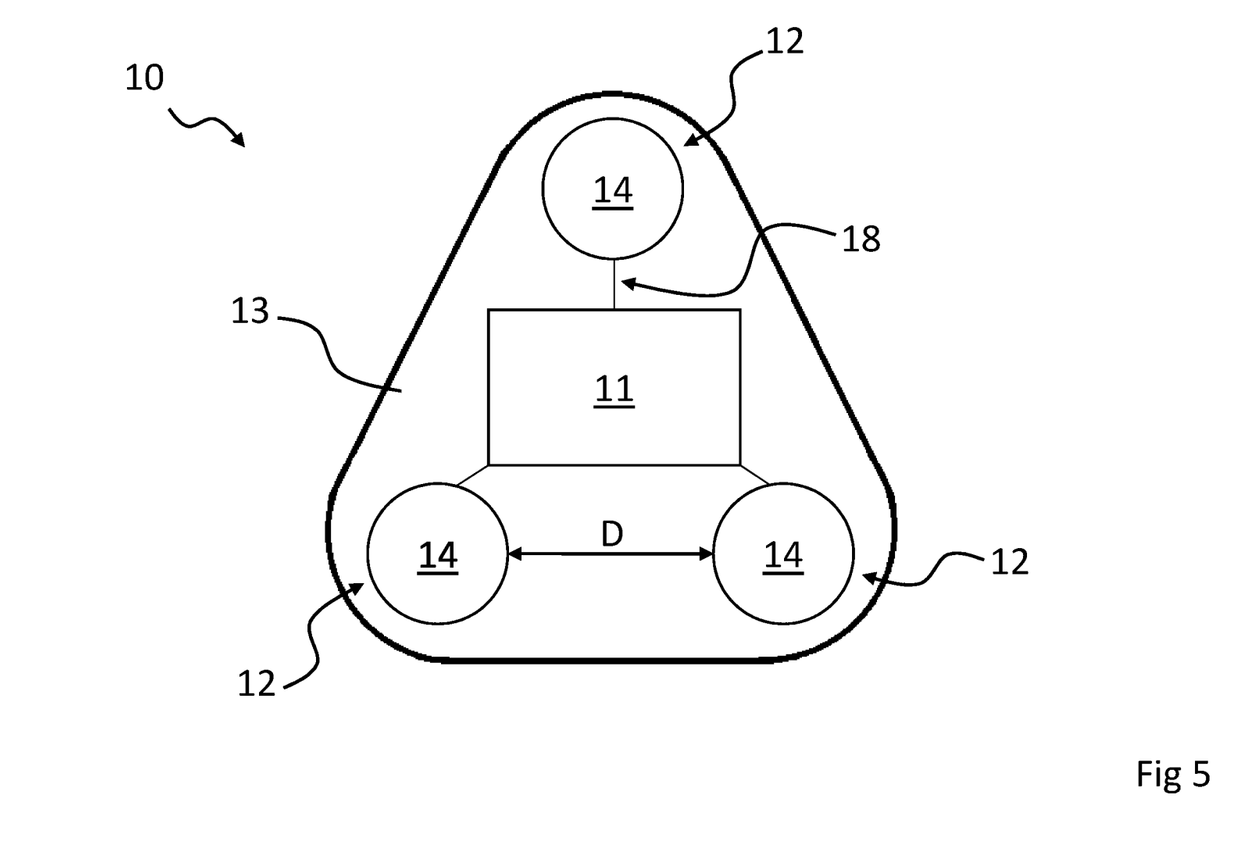
Figure 6:
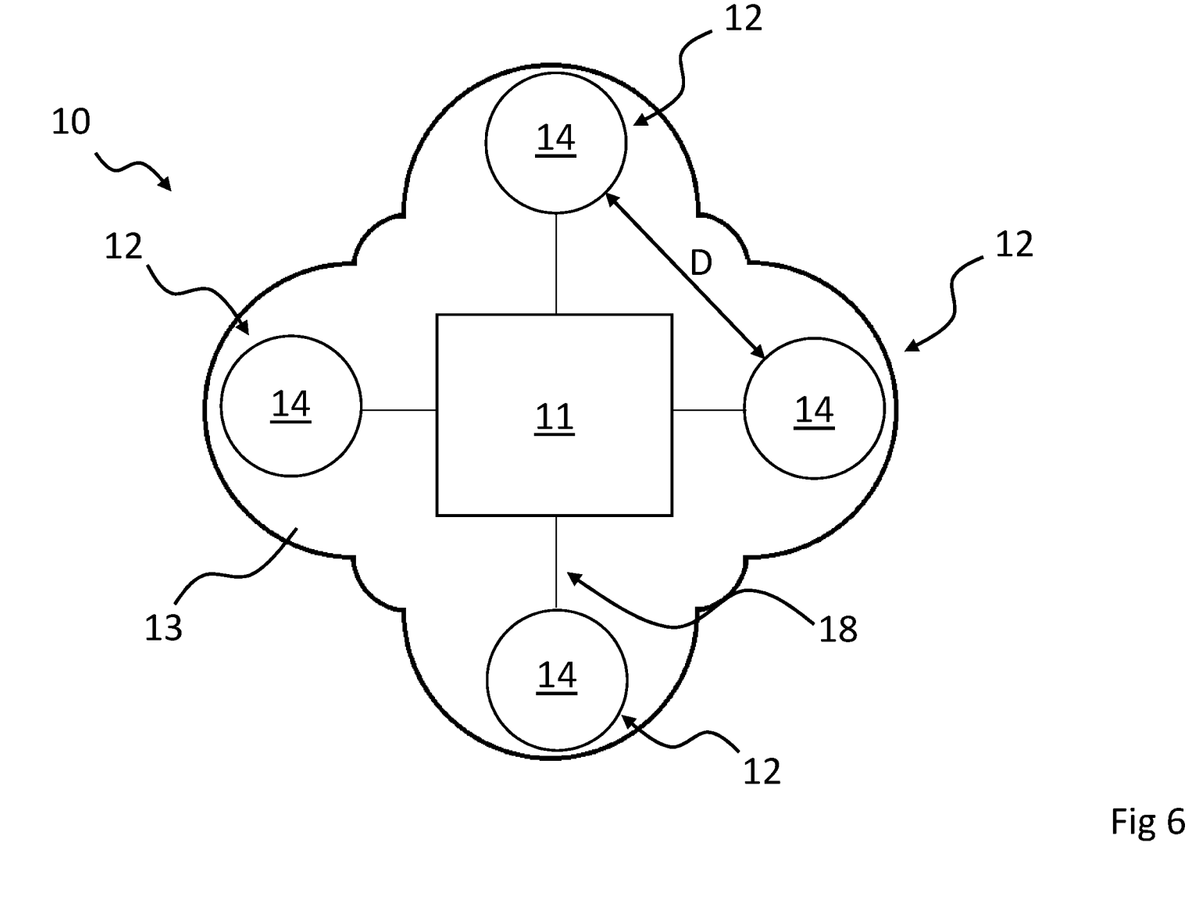

In some embodiments, as shown exemplarily in FIGS. 5 and 6, the plurality of accumulators comprises three and, respectively, four accumulators 14 arranged in an angularly equidistant way along a circle circumscribed to the electronic unit 11 and centred on the electronic unit, in positions placed towards the edges of the flexible support 13.

The invention claimed is:

1. A tyre comprising a monitoring device fixed on an inner surface of the tyre at a crown portion of the tyre,
    wherein the monitoring device comprises an electronic unit and an electric power supplier electrically connected to the electronic unit, the electronic unit comprises at least one sensor for detecting one or more of the following physical quantities: temperature, pressure, acceleration, and deformation; a processing unit; and a transceiver,
    wherein the monitoring device further comprises a flexible support in a single body and the electronic unit is fixed on the flexible support,
    wherein the electric power supplier comprises a plurality of electric energy accumulators, each accumulator is electrically connected to the electronic unit and suitable for supplying the electronic unit, and
    wherein each of the accumulators is fixed onto the flexible support.

2. The tyre according to claim 1, wherein each of the accumulators is an electric battery.

3. The tyre according to claim 1, wherein each of the accumulators comprises a rigid housing.

4. The tyre according to claim 1, wherein each of the accumulators has a charge capacity greater than or equal to 30 mAh, has a weight greater than or equal to about 0.5 g, and is inscribed in a circle having diameter lower than or equal to 30 mm, and is circumscribed to a circle having diameter greater than or equal to 15 mm.

5. The tyre according to claim 1, wherein the monitoring device further comprises an electric connection circuit for connecting each accumulator to the electronic unit; the electric connection circuit comprises at least two separate electric paths; and the accumulators are electrically connected to the electronic unit in parallel.

6. The tyre according to claim 1, wherein the monitoring device further comprises an electric connection circuit for connecting each accumulator to the electronic unit, and the electric connection circuit is printed onto the flexible support with a conductive ink or the electric connection circuit comprises copper conductive tracks.

7. The tyre according to claim 1, wherein a distance (D) between each pair of accumulators is greater than or equal to 40 mm and lower than or equal to 250 mm.

8. The tyre according to claim 1, wherein an equatorial plane of the tyre crosses the monitoring device.

9. The tyre according to claim 1, wherein the at least one sensor detects at least a radial component or a tangential component of the acceleration or of the deformation.

10. The tyre according to claim 1, wherein the flexible support is fixed to the inner surface of the tyre by a layer of adhesive.

11. The tyre according to claim 1, wherein the flexible support is substantially inextensible.

12. The tyre according to claim 1, wherein the flexible support is a film of an elastomeric or thermoplastic material chosen from nylon, polyethylene terephthalate (PET), polyethylenenaphthalate (PEN), polyimide, ethylene propylene diene monomer rubber (EPDM), diene polymers, and polyurethane resins.

13. The tyre according to claim 1, wherein two or more of the sensor, the processing unit, and the transceiver are arranged in a single assembly fixed on the flexible support.

14. The tyre according to claim 1, wherein the plurality of accumulators comprises a first and a second accumulator arranged at opposite sides of the electronic unit.

15. The tyre according to claim 14, wherein the monitoring device has a plan with elongated shape along a longitudinal direction (L) of main development, and the first and second accumulators are arranged at longitudinally opposite ends of the monitoring device.

16. The tyre according to claim 1, wherein the monitoring device is fixed to the inner surface of the tyre so that a straight line passing through the centres of mass of the accumulators forms, with a direction of intersection of an equatorial plane of the tyre with the inner surface of the tyre, a right angle (A) or an acute angle (A) greater than or equal to 20°.

17. The tyre according to claim 16, wherein the acute angle (A) is lower than or equal to 70°.

18. The tyre according to claim 1, wherein an aspect ratio (R) between a longitudinal length (L1) of the monitoring device and a width (L2) along a direction perpendicular to the longitudinal direction is greater than or equal to 2 and lower than or equal to 6.

19. The tyre according to claim 1, wherein the plurality of accumulators comprises two and no more than two accumulators.

20. The tyre according to claim 1, wherein the plurality of accumulators comprises at least a third accumulator.

21. The tyre according to claim 1, wherein the plurality of accumulators comprises a fourth accumulator.

22. The tyre according to claim 20, wherein the accumulators are arranged substantially angularly equidistant from each other around the electronic unit.

23. The tyre according to claim 1, wherein the accumulators are arranged at end positions of the flexible support.

24. The tyre according to claim 8, wherein the equatorial plane of the tyre crosses the electronic unit.

* * * * *